Figure 1:
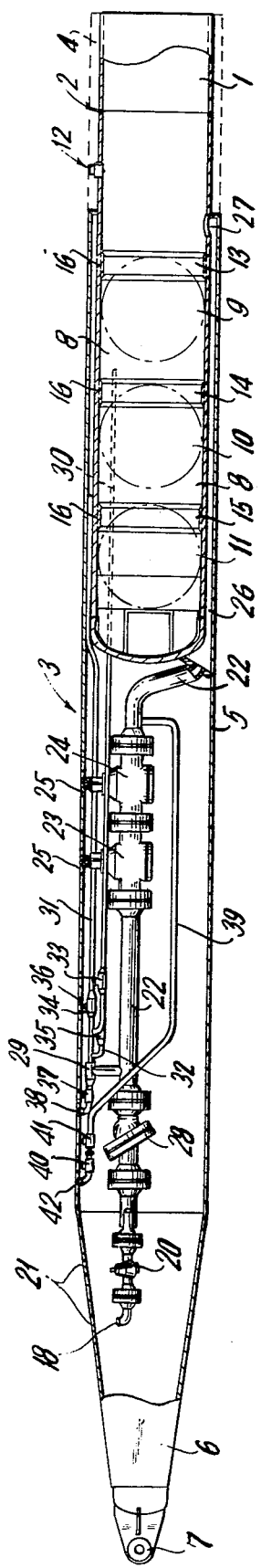

United States Patent [19]
Scodino et al.

[11] 3,948,085
[45] Apr. 6, 1976

[54] BALL LAUNCHING HEAD FOR TESTING A PIPELINE LAID ON A SUBMERGED BED

[75] Inventors: Ambrogio Scodino, San Donato Milanese; Germano Ziliani, Piacenza, both of Italy

[73] Assignee: Saipem S.p.A., San Donato Milanese, Italy

[22] Filed: Feb. 22, 1974

[21] Appl. No.: 444,771

[30] Foreign Application Priority Data
Feb. 23, 1973 Italy................................. 20744/73

[52] U.S. Cl. ............................................... 73/49.8
[51] Int. Cl.² ......................................... G01M 3/02
[58] Field of Search.......... 73/3, 40.5 R, 49.1, 49.5, 73/49.8; 138/90, 97

[56] References Cited
UNITED STATES PATENTS
2,705,419  4/1955  Chawner .......................... 73/40.5 R
3,533,447  10/1970  Moore et al. ..................... 73/40.5 X
3,720,089  3/1973  Davis et al. ............................. 73/3

Primary Examiner—Charles A. Ruehl
Attorney, Agent, or Firm—Ralph M. Watson

[57] ABSTRACT

A pipeline closing head, for use in testing a pipeline after it has been laid on a submerged bed by subjecting the pipeline temporarily to internal pressure through the use of filling and emptying balls, is constituted by a hollow cylindrical body having a crowned closing element at one end and containing, at its other end, an air tight chamber housing the filling and emptying balls. Ducts and control valves through which fluid is supplied to said chamber to activate the filling and emptying balls and supply fluid pressure to the interior of the pipeline are housed within the cylindrical body so that they do not overhang the closing head, which may slide along a conventional ramp for the pipeline.

5 Claims, 2 Drawing Figures

BALL LAUNCHING HEAD FOR TESTING A PIPELINE LAID ON A SUBMERGED BED

The present invention relates to a new type of pipeline closing head which, contains all the elements necessary for the testing of a pipeline laid on a submerged bed. Since said elements do not overhang from that head and are suitably arranged herein, this facilitates such testing and allows the head to slide along the ramp supporting the pipeline, without requiring special provision therefor.

The testing of a pipeline laid on a submerged bed consists, as well known, in filling with water the pipeline to be tested, whose ends have been welded to two closing heads respectively, by letting a ball pushed by the filling water, run along the pipeline in bringing the pressure inside the pipeline to a predetermined value and in keeping said pressure value for the period of time fixed by the user and, finally, in ejecting the water from the pipeline by letting one or two other balls pushed by the emptying air run along the pipeline.

According to the prior art, such a testing involves a rather heavy and long preliminary work in adapting the pipeline thereof. In fact, before the closing head is welded to the pipeline to be tested, it is necessary to make provisions for housing the said filling and emptying balls inside the pipeline in such a way as to prevent these balls from moving out of place because of their own weight or other casual stresses; it is furthermore necessary to make appropriately spaced holes in the pipeline for the installation through welding of the ducts which have to convey into the pipeline the water and air pushing the balls, and it is necessary then to weld to these ducts other service ducts connecting the control valves to the unions for hoses coming from a floating vessel. The above gives rise to two other fundamental drawbacks. First of all, since the afore-said conveying ducts have to be welded to the pipeline at the rear of the relevant balls, it follows that the relevant control valves will be rather far from each other, which makes the valve closing and opening operation difficult for the frogman who has to continuously move from one valve to another, said moving being difficult particularly in deep-waters. On the other hand, since all the ducts and relevant valves are located outside the pipeline and there are hence overhanging parts which may run aground, the sliding of the head of the pipeline to be tested along the ramp may be carried out only if use is made of particular expedients able to avoid such running aground.

It is an object of the present invention to eliminate the afore-said drawbacks and to provide a pipeline closing head which, besides facilitating the testing, may slide along the ramp supporting the pipeline without requiring special provision therefor.

This fact is accomplished, according to the invention, by making use of a cylindrical head having the same outer diameter as the Gunite-coated pipeline to be tested, which head ends with a crowned closing element and presents in its front part a housing for the filling and emptying balls, all the conveying and service ducts, the relevant control valves and the unions for the hoses being placed inside the middle part of the head so that all the control valves are assembled into a small space.

According to another distinctive feature of the invention, each of the filling and emptying balls is kept in the desired position inside the housing by a beveled steel ring which is fixed into said housing in a suitable position and which is thick enough to prevent the ball from coming out from the housing because of its own weight or other casual stresses.

According to another distinctive feature of the invention, each ball is pushed out from its housing and moved during the first length of its run by the water or air conveyed to the rear of the ball through a secondary conveying duct provided with control valves and derived from the main conveying duct, said ball being pushed by the full flow of water or air conveyed through the main conveying duct only after said ball has passed a ball-passage indicator provided in the head, which trasmits a signal to a floating vessel.

According to another distinctive feature of the invention, the said secondary ducts and the main conveying duct are contained in correspondence of the ball housing into the part of the head comprised between the outer diameter of the housing, which is like to the one of the pipeline, and the inner diameter of the same head so that no overhanging elements are present, the secondary ducts having their outlet ports into the ball housing at a point located upstream of the relevant balls respectively, while the outlet port of the main duct is located downstream of the said housing.

According to a further distinctive feature of the invention, the said secondary conveying ducts are connected through a control valve to a union for an air pump serving to suck successively the filling and emptying balls into their housing before the head is welded to the pipeline to be tested.

According to a preferred embodiment, the main conveying duct and the high-pressure duct are then intercepted each by two ball valves in order to minimize leaks during testing; upstream of the main conveying duct there is a check valve serving to avoid a leak of the compressed air contained in the pipeline to be tested, during the motion of the balls emptying the water, in the case of a breakage of the hoses and, finally, two distinct unions for the hoses are provided in order to reduce the overall dimensions and weights of the same hoses for the sake of practical usage.

The invention will be now described with reference to the accompanying drawing which shows a merely exemplary and non-limiting embodiment, in that the adoption of constructional techniques or equivalent elements different from those specifically described herein lies within the scope of the present invention.

Figure 2:
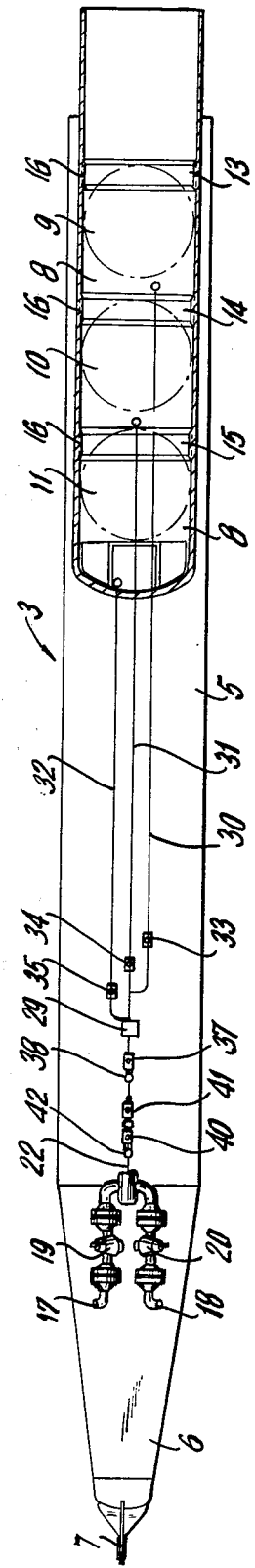

In said drawing:

FIG. 1 is a longitudinal, sectional view of the pipeline closing head according to the invention, and FIG. 2 is a schematic top view of the head of FIG. 1.

In the drawings, the reference numeral 1 indicates the end of the pipeline to be tested, whereto the closing head 3 is fixed by means of the welding 2, and the reference numeral 4 the Gunite-coating of the same pipeline. Said head 3 comprises a hollow cylindrical body 5 which presents an outer diameter corresponding to that of the coating 4 of the pipeline and ends at its rear part with a crowned closing element 6 provided with an eyelet 7 facilitating hooking to the cable imparting the necessary tensile stress to the pipeline during the sliding of the latter along a ramp. Into the front part of body 5 of the head there is then welded an airtight cylindrical chamber 8 which houses the filling ball 9 and the emptying balls 10 and 11, said chamber having the same diameters as the pipeline to be tested and extending outside the body 5 for a certain length in a middle point of which there is a ball-passage indicator 12. The said balls 9, 10 and 11 are prevented from coming out from housing 8 because of their own weight or other casual stresses by three beveled steel rings 13, 14 and 15 respectively, which are fixed into the housing at a suitable distance from each other and keep the said balls in the desired position by means of the thickness of their edge 16.

Into the middle part of body 5 of the head there are then two distinct unions 17 and 18 for as many hoses coming from a floating vessel, (not shown) which pipe into the main conveying duct 22 the water or the air pushing the said balls through the relevant control valves 19 and 20 easily accessible from the outside of the head through the passageway holes 21 provided on the surface of body 5. Said duct 22 is intercepted by two series connected control valves 23 and 24 easily accessible through the passageway holes 25, and it is joined to an outflow channel 26 in the space between the body 5 and the housing 8 and communicating with into the interior of the said housing 8 through an outlet port 27 located downstream the ball 9. Upstream of the said valves 23 and 24 of the main duct 22 there is furthermore a check valve 28 serving to prevent the fluid pushing the balls to flow back in the case of a breakage of the hoses, while downstream of the said check valve 28 there is a branch pipe 29 connecting the duct 22 to three secondary conveying ducts 30, 31 and 32 respectively. Said secondary ducts are intercepted by the control valves 33, 34 and 35 easily accessible through the hole 36, pass into the zone between the body 5 and the housing 8 and are connected to the said housing 8 at points located upstream of the balls 9, 10 and 11 respectively.

On the other hand the three secondary conveying ducts 30, 31 and 32 are also connected through the control valve 37 to a union 38 for an air pump serving to suck successively the balls 9, 10 and 11 into the housing 8. Finally, a high-pressure duct 39 intercepted by two series connected control valves 40 and 41 serves to convey the pressure necessary for the testing of the pipeline from the hose connected to the union 42 into the said main duct 22 at a point located downstream of the said control valves 23 and 24.

It will now be understood from the freezing that such a head makes the testing of a pipeline laid on a submerged bed very easy since said head does not require complicated preliminary operations before welding, does not present overhanging parts or elements, has its control valves assembled into a small space and minimizes leaks.

The use of this ball launching head is as follows.

Before the head is welded to the pipeline end and the pipeline length near the connection zone (shown by dashed line in FIG. 1) is coated with Gunite, it is necessary only to connect an air pump to the union 38 for the purpose of sucking successively the balls 11, 10 and 9 into their housing 8 by opening the control valve 37 and acting on the control valves 35, 34 and 33 respectively. After the above-said valves have been closed and the welding has been made, the head may then be caused to run along the pipeline supporting ramp without the requirement of any special provision therefor as no overhanging parts or elements are present, the eyelet 7 being hooked to the traction cable. When the pipeline and the head have been laid on a submerged bed, a frogman begins the filling and testing operations by connecting the hoses of water pumps located on a floating vessel (not shown) to the unions 17 and 18 and the hose of a high-pressure pump to the union 42 and by opening the control valves 19, 20 and 33. In such a way the water for filling the pipeline to be tested is conveyed into the secondary duct 30 and the filling ball 9 is pushed out from its housing and moved during the first length of its run only by the small water flow of the duct 30 with an energy saving and leak reduction. After the ball 9 has passed the ballpassage indicator 12, the frogman opens the valves 23 and 24 of the main conveying duct 22 so that use is made of the full flow of the filling water for carrying out the motion of the ball 9 toward the other end of the pipeline. The water filling is continued till the limit allowed by the pumps is reached. At this point the frogman closes the valves 17, 18, 23, 24 and 33 and opens the high-pressure valves 40 and 41 which are kept open till the pressure within the pipeline does not reach a predetermined testing value. Said testing pressure is kept constant into the pipeline for the period of time fixed by the user and it is then released by opening again the said valves 40 and 41. At this point the hoses connected to the unions 17 and 18 are connected to an air compressor on a floating vessel (not shown) and the frogman closes the valves 40 and 41 and opens the control valves 19 and 20 and the valve 34 of the secondary duct 31. In such a way the emptying ball 10, moved and pushed by only the air of the duct 31 (further saving of energy and reduction of leaks) begins the ejection from the pipeline of the water. When the ball 10 has passed the said indicator 12, the frogman again opens the valves 23 and 24 of the main duct 22 so that the full thrust is given to the ball 10 running toward the other end of the pipeline. The launching and the motion of the third emptying ball 11 is obtained in a similar way by opening the valve 35 of the secondary duct 32 after the valves 23, 24 and 34 have been closed.

What we claim is:

1. An improved pipeline closing head adapted for attachment to an end of a Gunite-coated pipeline laid on a submerged bed for use in testing said pipeline by means of a filling ball adapted to be pushed through the pipeline from the head to the opposite end of the pipeline by water delivered upstream of the filling ball so that said pipeline is filled with water held at a predetermined pressure for a selected period of time and emptying balls adapted to be pushed by air through the pipeline from the head to said opposite end to eject water therefrom and then empty the pipeline of water, wherein the improvement comprises:

a hollow cylindrical body having an outer diameter corresponding to the outer diameter of the Gunite coating of the pipeline;

a crowned closing element at the rear end of the cylindrical body;

a cylindrical housing member, closed at its rear end to provide an air tight chamber adapted to contain the filling ball and the emptying balls, mounted in the cylindrical body so that its front portion extends outwardly beyond the front end of the cylindrical body for attachment to an end of the pipeline, said housing member having inner and outer diameters corresponding to the inner and outer diameters of the pipeline;

a ball passage indicator located in said extending front portion of the housing member;

conveying ducts mounted within said cylindrical body and adapted to deliver fluid to the upstream side of each of said filling ball and said emptying balls, respectively; and valves mounted within the cylindrical body and associated with said conveying ducts for individually controlling the flow of fluid through the respective ducts;

said cylindrical body being provided with a series of ports affording access to said conveying ducts and the control valves therefor.

2. A pipeline closing head as claimed in claim 1, including a series of beveled steel rings mounted on the inner wall of said cylindrical housing and adapted, respectively, to retain said filling and emptying balls therein against accidental displacement.

3. A pipeline closing head as claimed in claim 1, wherein the outer diameter of the housing member is smaller than the inner diameter of the cylindrical body so that a passageway is provided between them;

said conveying ducts include a main conveying duct and a secondary conveying duct for each of said filling and emptying balls; and said head also includes a check valve associated with said main conveying duct;

a control valve for said main conveying duct located downstream of said check valve; and a channel connecting the main conveying duct with said passageway between the housing member and the cylindrical body at a point downstream of the housing for the filling ball.

4. A pipeline closing head as claimed in claim 3, wherein the conveying ducts include a high pressure duct connected to the main conveying duct at a point downstream of said control valve for the main conveying duct so that fluid supplied to the main conveying duct through the high pressure duct flows through said passageway; and a control valve for said high pressure duct.

5. A pipeline closing head as claimed in claim 3, wherein each of said secondary conveying ducts is connected with the main conveying duct at a point between said check valve and said control valve for the main conveying duct and leads therefrom through said passageway between the housing member and the cylindrical body to a point upstream of its associated filling or emptying ball.

* * * * *

UNITED STATES PATENT AND TRADEMARK OFFICE
CERTIFICATE OF CORRECTION

PATENT NO. : 3,948,085
DATED : April 6, 1976
INVENTOR(S) : Ambrogio Scodino and Germano Ziliani It is certified that error appears in the above-identified patent and that said Letters Patent are hereby corrected as shown below:

Column 1, line 9, Correct "herein" to read --therein-- line 25, Correct "thereof" to read --therefor--

Column 3, line 22, Cancel "into"

line 46, Correct "freezing" to read --foregoing--.

Signed and Sealed this

First Day of March 1977

[SEAL]

Attest:

RUTH C. MASON
Attesting Officer

C. MARSHALL DANN
Commissioner of Patents and Trademarks